United States Patent [19]
Gujer et al.

[11] Patent Number: 5,558,956
[45] Date of Patent: Sep. 24, 1996

[54] SYSTEM FOR ISOLATING BATTERIES DURING TESTING

[76] Inventors: Rudolf Gujer, 18423 McCoy Ave., Saratoga, Calif. 95070; Clifford B. Simpson, 6452 Hesket Ct., San Jose, Calif. 95123

[21] Appl. No.: 522,211

[22] Filed: Aug. 30, 1995

[51] Int. Cl.$^6$ ........................................... H01M 2/10
[52] U.S. Cl. ................... 429/99; 429/9; 429/100
[58] Field of Search ........................... 429/99, 100, 9, 429/96

[56] References Cited

U.S. PATENT DOCUMENTS

| | | | |
|---|---|---|---|
| 1,901,272 | 3/1933 | Tatro | 429/9 |
| 4,593,461 | 6/1986 | Thiele et al. | 429/100 X |
| 4,724,189 | 2/1988 | Chase | 429/99 |

*Primary Examiner*—John S. Maples
*Attorney, Agent, or Firm*—Jame Hsue; Karen Perkins

[57] ABSTRACT

An apparatus for shielding adjacent batteries during testing includes a shell with partitions to form an array of pockets, and a cover with shields. When a cover is placed in a closed position on top of the shell, each shield would contact a corresponding partition to completely isolate two batteries placed in two pockets adjacent to the shield and partition. In this manner, even if a battery catches fire or leaks, the partition and the shield minimizes the effect on an adjacent battery.

9 Claims, 3 Drawing Sheets

5,558,956

SYSTEM FOR ISOLATING BATTERIES DURING TESTING

BACKGROUND OF THE INVENTION

This invention relates in general to systems for testing batteries and, in particular, to a system for isolating batteries during testing.

When properties of batteries, such as the recharging properties of rechargeable batteries, are being tested, the testing process can cause hazards such as fires. Thus, if the batteries malfunction due to leaks or shorts or if the wrong types of batteries are tested, the batteries can catch fire. Hence, if a number of batteries are tested in close proximity to one another, a fire originating from one battery can spread to other batteries even though these other batteries may be functioning normally. For efficient testing, it is not uncommon for a number of batteries to be placed in close proximity to one another during testing. It is therefore desirable to provide testing equipment that would isolate the batteries from one another so as to reduce the effect of heat or fire from one battery on the remaining batteries in the vicinity.

SUMMARY OF THE INVENTION

This invention is based on the observation that by placing batteries in pockets to separate the batteries and using a cover including at least one shield to block the opening of at least one pocket from an adjacent pocket, the effect on adjacent batteries of fire or heat originating from a battery inside one such pocket will be reduced.

One aspect of the invention is directed towards an apparatus for isolating batteries during testing. The apparatus comprises a container with a plurality of pockets arranged in an array, each pocket adapted to receive and hold a battery and each pocket having an opening for passage of the battery into the pocket. The apparatus further comprises a cover including at least one shield blocking the opening of said at least one pocket from an adjacent pocket, so that a battery inside said at least one pocket is shielded from a battery in the adjacent pocket.

Another aspect of the invention is directed towards a method for testing batteries employing a container with an array of pockets, each pocket adapted to receive and hold a battery, and each pocket having an opening for receiving a battery into the pocket. The method comprises inserting a battery into each of at least some of the pockets adjacent to one another, and electrically connecting each of said batteries in said at least some of the pockets to at least one tester device. The method further comprises shielding a battery in one of the pockets from a battery in an adjacent pocket and testing the batteries.

BRIEF DESCRIPTION OF THE DRAWINGS

Identical components are labeled by the same numerals in this application.

DETAILED DESCRIPTION OF THE PREFERRED EMBODIMENT

Figure 1B:
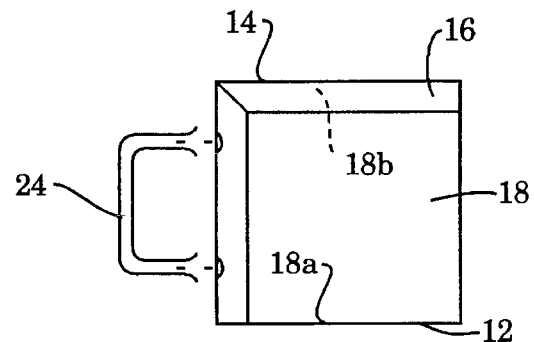
FIG. 1B is a cross-sectional view of apparatus 10 of FIG. 1A taken along the line 1B—1B in FIG. 1A.
Figure 1A:
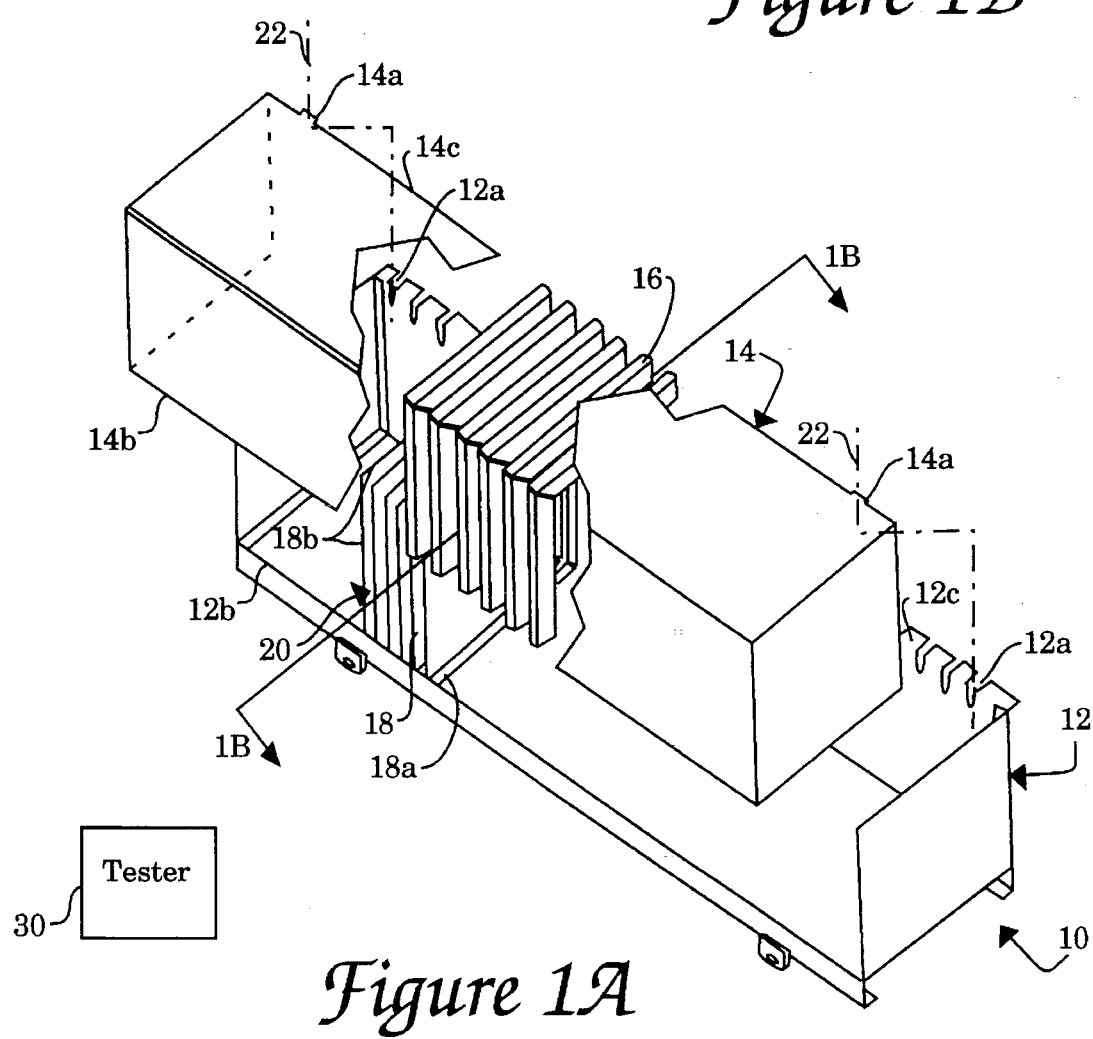
FIG. 1A is a perspective view of an apparatus for isolating batteries during testing to illustrate the preferred embodiment of the invention. The apparatus includes a shell with partitions and a cover including shields, where the partitions of FIG. 1A together with the shields act to shield each battery from all adjacent batteries. Part of the cover is omitted to show a cut-away view of the shields underneath the cover.

FIG. 1A is a perspective view of an apparatus 10 for isolating batteries during testing to illustrate the preferred embodiment of the invention. Apparatus 10 includes a shell 12 having a generally L-shaped cross-section and a cover 14. In FIG. 1A, cover 14 is raised from its shielding position from shell 12 and a portion of the cover 14 has been omitted in a cutaway view to reveal the shields 16 under the cover. Shields 16 may be attached to the inside surface of cover 14 by a conventional process such as spot welding. Alternatively, shields 16 and cover 14 may form an integral body; in such instance, the integral body is referred to as the cover. Shell 12 supports thereon a number of partitions 18. Partitions 18 have flanges 18a attached to the inner surfaces of shell 12 by a conventional process such as spot welding. Alternatively, partitions 18 and shell 12 may form an integral body. Whether the partitions 18 and shell 12 are separate entities attached together or whether they form an integral body, the partitions and the shell together form a container for a number of batteries. As shown in FIG. 1A, the partitions 18 are arranged in an array, such as a linear array, where the space 20 between any two adjacent partitions and the portion of shell 12 between the two adjacent partitions together define a pocket for holding a battery during testing. In this manner, the container defines a linear array of pockets 20, each for receiving a battery. Each pocket has a L-shaped opening for passage of the battery into the pocket, where the L-shaped opening is the space between the unconnected edges (unconnected to shell 12) 18b of the two adjacent partitions.

Cover 14 has two brackets 14a positioned to be inserted into corresponding notches 12a of the shell so that when this happens, cover 14 is in its shielding position, and cover 14 and shell 12 together entirely enclose the partitions and the space between the cover and the shell, for shielding each of the batteries in the pockets from other batteries in the pockets. The matching of brackets 14a and notches 12a are shown by dotted lines 22. When brackets 14a are inserted into notches 12a, the shields 16 are positioned so that preferably, each shield matches the position of a partition 18. In the preferred embodiment shown in FIGS. 1A and 2, shield 16 is generally L-shaped and has a U-shaped cross-section so that when brackets 14a are inserted into notches 12a, each shield 16 would preferably entirely enclose the edge 18b of the corresponding partition. This is best illustrated in FIG. 2 described below.

When cover 14 is placed in its shielding position on top of shell 12 to substantially entirely enclose the space between the cover and the shell and so that when brackets 14a are inserted into notches 12a, the cover 14 is set in its shielding or closed position. In this position, edge 14b would contact edge 12b of the shell and edge 14c would contact tabs 12c of the shell. When cover 14 is in its shielding or closed position, the inside surface of each shield 16 would contact the edge 18b of the corresponding partition.

Figure 2:
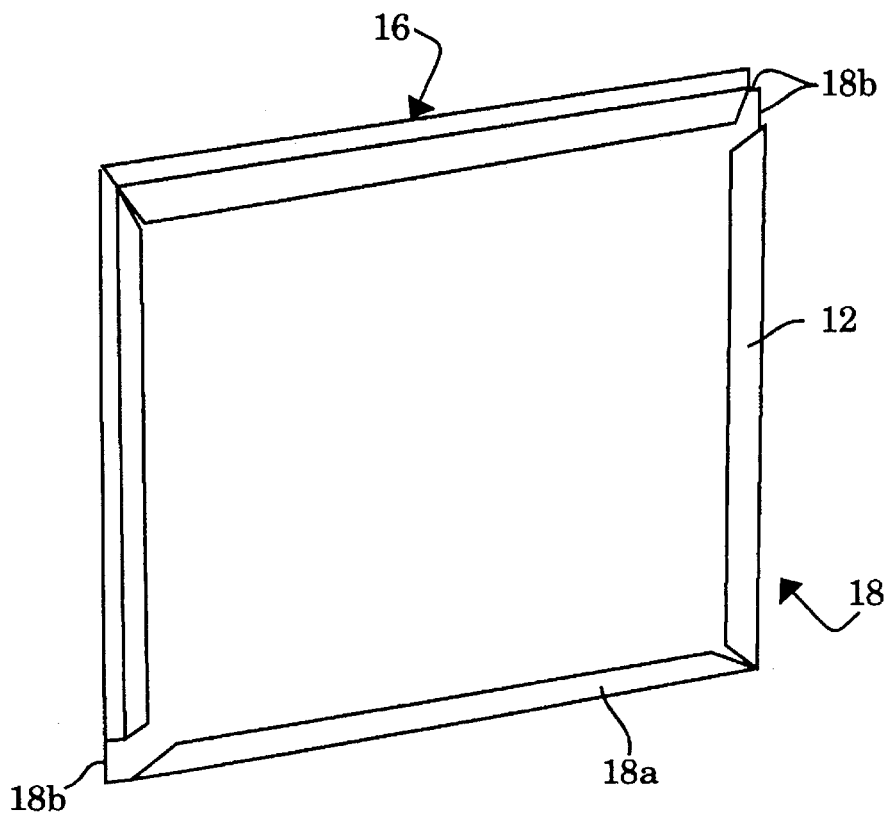
FIG. 2 is a perspective view of a partition and one shield of the apparatus of FIG. 1A where the shield is in position together with the partition to separate a battery placed next to the partition from an adjacent battery.

FIG. 2 is a perspective view of a partition 18 and its corresponding shield shown at the position where cover 14 is slightly above its shielding or closed position above shell 12 as well as slightly displaced away laterally from shell 12 so that shield 16 does not contact edge 18b of its corresponding partition. FIG. 1B is a cross-sectional view of apparatus 10 of FIG. 1A taken along the line 1B—1B in FIG. 1A when cover 14 is in its shielding or closed position, to show more clearly the relative positions of the shield 16 and partitions 18, as well as the relative positions of cover 14 and shell 12. FIG. 1B also shows a handle 24 that is adapted to be attached to cover 14.

Figure 3:
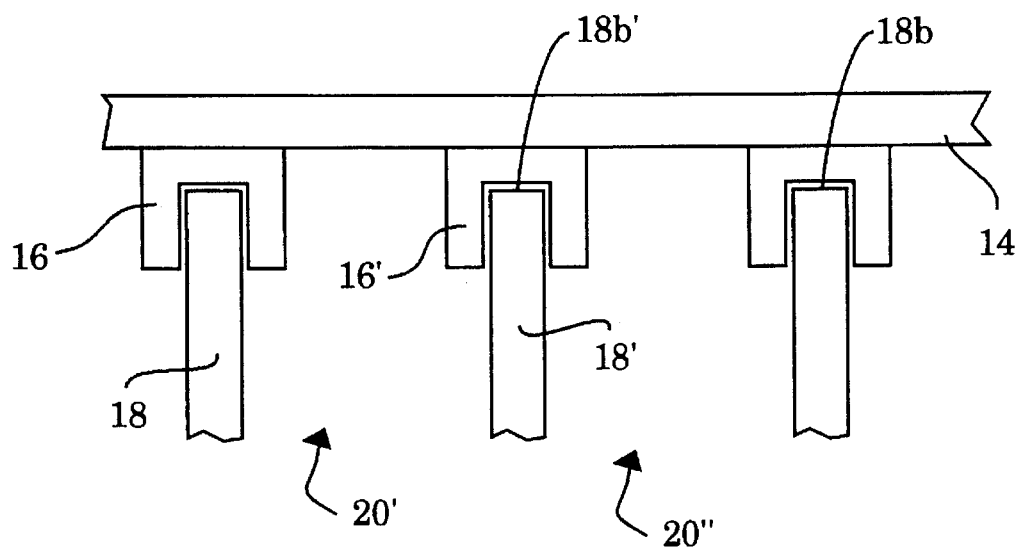
FIG. 3 is a cross-sectional view of a portion of the cover and of three shields and portions of three partitions of the apparatus of FIG. 1A along the lines 3—3 in FIG. 1A when the cover is in place over the shell for shielding batteries to illustrate the preferred embodiment of the invention.

FIG. 3 is a cross-sectional view of a portion of cover 14, of three shields 16, and of portions of three partitions corresponding to the three shields where cover 14 is in its closed position to illustrate the preferred embodiment of the invention. As shown in FIG. 3, when cover 14 is in its closed position, the inside surfaces of the shields are in contact with edges 18b of the corresponding partitions. In this position, each shield and its corresponding partition would contact. In FIG. 3, for example, the inside surface of a shield 16' of the three shields would contact edge 18b' of the partition 18' corresponding to shield 16' to thereby completely isolate the battery in space 20' from the battery in space 20". In this manner, even if the battery in space 20' catches fire or otherwise generates heat or leakage of fluids, shield 16' and partition 18' would greatly reduce the effects of such flames, heat or leakage on the battery in pocket 20". From FIGS. 2 and 3, it will be evident that each of the generally L-shaped shield 16 would contact the L-shaped edge 18b of its corresponding partition 18 along an L-shaped line of contact so as to completely isolate from one another the two adjacent pockets or spaces on the two sides of the partition and the shield.

Figure 4:
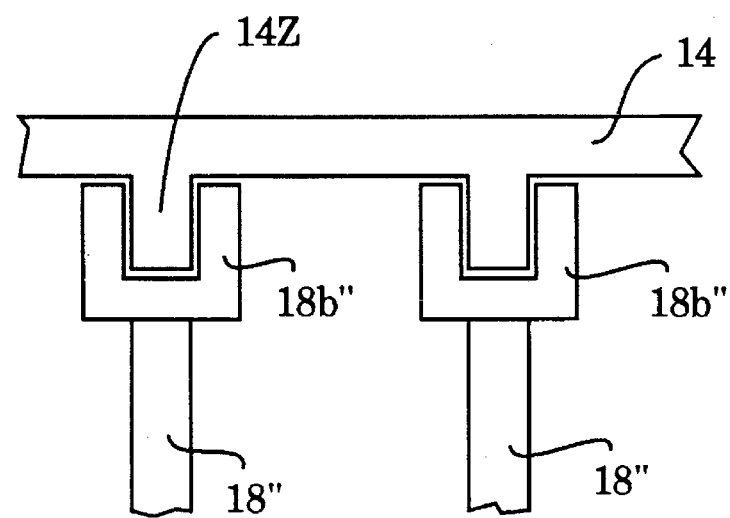
FIG. 4 is a cross-sectional view of a portion of the cover, two shields and portions of two partitions to illustrate a first alternative embodiment of the invention.

Instead of employing shields that have U-shaped cross-sections and partitions with straight edges, it is also possible to reverse the roles and employ partitions with edges that have U-shaped cross-sections and shields that are simple ridge-like protrusions from the cover 14, such as shown in FIG. 4. Thus, as shown in FIG. 4, the edge portion 18b" of partition 18" has a U-shaped cross-section where the space between the two prongs of the "U" of the edge is shaped to receive the ridge-like protrusion 14Z, so that when cover 14 is in the shielding or closed position, either or both portions 18b" would be in contact with cover 14 or protrusion 14Z would be in contact with the inside surface of the U-shaped portion 18b". In either case, the partition together with its corresponding ridge-shaped shield 14Z would completely isolate from one another the batteries in the two pockets adjacent to and on the two sides of such partition and shield. Preferably, the ridge-like protrusions or shields 14Z would form an integral body with cover 14.

Figure 5:
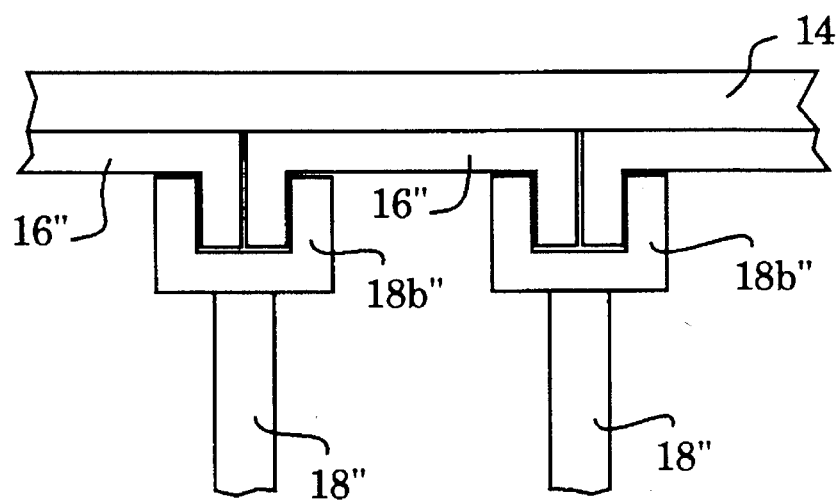
FIG. 5 is a cross-sectional view of a portion of a cover, two shields and portions of two partitions to illustrate a second alternative embodiment of the invention.

FIG. 5 is a cross-sectional view of a portion of cover 14, two shields 16" and two corresponding partitions to illustrate a second alternative embodiment of the invention. FIG. 5 differs from FIG. 4 only in that, instead of being ridge-shaped ridges, the shields 16" are elongated bodies having a U-shaped cross-section, where the abutting stems of two adjacent shields would fit into the space between the two prongs of the "U" of the U-shaped portion 18b".

To use the apparatus described above to isolate batteries during testing, first a shell with partitions and a cover with shields of the types described above are first provided. A battery is then inserted into each of at least some of the pockets 20, such as pockets in FIG. 1A. Each of said batteries is then electrically connected to a tester device 30 through wires (not shown) that may pass through holes (not shown) in shell 12. The battery in each of said at least some of the pockets is then shielded from a battery in an adjacent pocket, such as by placing cover 14 in its shielding or closed position. The batteries are then tested by means of tester 30. In the preferred embodiment, the above-described shielding step is performed by aligning each of the shields 16 with a corresponding or a respective partition and causing relative motion between the cover and container until the shields are very close to or contact their corresponding or respective partitions.

Instead of matching each shield with a partition, it is also possible to match each shield (such as the ridge-shaped shields of FIG. 4) with each L-shaped opening between the adjacent edges 18b of any two adjacent partitions (such as those shown in FIG. 1A). In such event, each of the shields would be aligned with a respective or corresponding opening instead of the corresponding edge of a partition. Relative motion is caused between the cover and the container until the shields block their respective or corresponding openings.

The invention has been described above by reference to various embodiments. It will be understood that different changes and modifications may be made without departing from the scope of the invention which is to be defined only by the appended claims.

What is claimed is:

1. An apparatus for isolating batteries during testing, comprising:
   (a) a container including
      (i) a shell; and
      (ii) a plurality of partitions arranged in a linear array and attached to the shell, so that any two adjacent partitions and a portion of the shell between such two adjacent partitions form a pocket, each pocket adapted to receive a battery, each pocket having an opening for passage of the battery into the pocket, and wherein at least one of the partitions separating two adjacent pockets has a edge; and
   (b) a cover including at least one shield blocking the opening of at least one pocket from an adjacent pocket, said shield having a U-shaped cross-section, and being shaped to enclose the edge of said partition, so that a battery inside said at least one pocket is shielded from a battery in the adjacent pocket.

2. The apparatus of claim 1, said cover comprising a plurality of shields, each shield together with a corresponding partition separating batteries in two adjacent pockets, one on each side of the partition.

3. The apparatus of claim 1, said container further comprising an electrically insulating layer lining said pockets, and an electrically insulating layer lining said shield and cover.

4. The apparatus of claim 1, wherein said cover includes an L-shaped plate, and wherein said shield is an integral part of the cover.

5. An apparatus for isolating batteries during testing, comprising:
   (a) a container including (i) a shell; and (ii) a plurality of partitions arranged in a linear array and attached to the shell, so that any two adjacent partitions and a portion of the shell between such two adjacent partitions form a pocket, each pocket adapted to receive a battery, each pocket having an opening for passage of the battery into the pocket, wherein at least one of the partitions separating two adjacent pockets has a U-shaped cross-section portion facing at least one shield, said portion shaped to enclose a protrusion of said shield; and (b) a cover including at least one said shield blocking the opening of at least one pocket from an adjacent pocket, and wherein the at least one shield has a said protrusion, so that batteries in two adjacent pockets separated by the partition with the U-shaped portion are shielded from each other.

6. The apparatus of claim 5, said U-shaped cross-section portion defining a space therein, wherein said shield includes one or more ridges shaped to fit into said space.

7. The apparatus of claim 5, said cover comprising a plurality of shields, each shield together with a corresponding partition separating batteries in two adjacent pockets, one on each side of such partition.

8. The apparatus of claim 5, said container further comprising an electrically insulating layer lining said pockets, and an electrically insulating layer lining said shield and cover.

9. The apparatus of claim 5, wherein said cover includes an L-shaped plate, and wherein said shield is an integral part of the cover.

* * * * *